No. 643,991. Patented Feb. 20, 1900.
G. B. TAYLOR.
MACHINE FOR CUTTING SPIRAL AND HELICAL TEETH IN CHUCK JAWS.
(Application filed Sept. 27, 1899.)
(No Model.) 3 Sheets—Sheet 1.

Witnesses
Inventor
George B. Taylor
By James L. Norris

No. 643,991. Patented Feb. 20, 1900.
G. B. TAYLOR.
MACHINE FOR CUTTING SPIRAL AND HELICAL TEETH IN CHUCK JAWS.
(Application filed Sept. 27, 1899.)
(No Model.) 3 Sheets—Sheet 2.

Witnesses
F. B. Keefer
W. Lee Helms.

Inventor
George B. Taylor
by James L. Norris
atty

No. 643,991. Patented Feb. 20, 1900.
G. B. TAYLOR.
MACHINE FOR CUTTING SPIRAL AND HELICAL TEETH IN CHUCK JAWS.
(Application filed Sept. 27, 1899.)
(No Model.) 3 Sheets—Sheet 3.
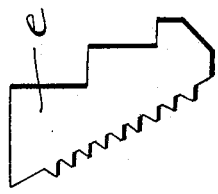
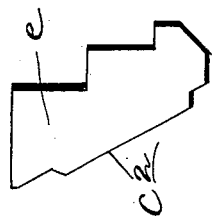
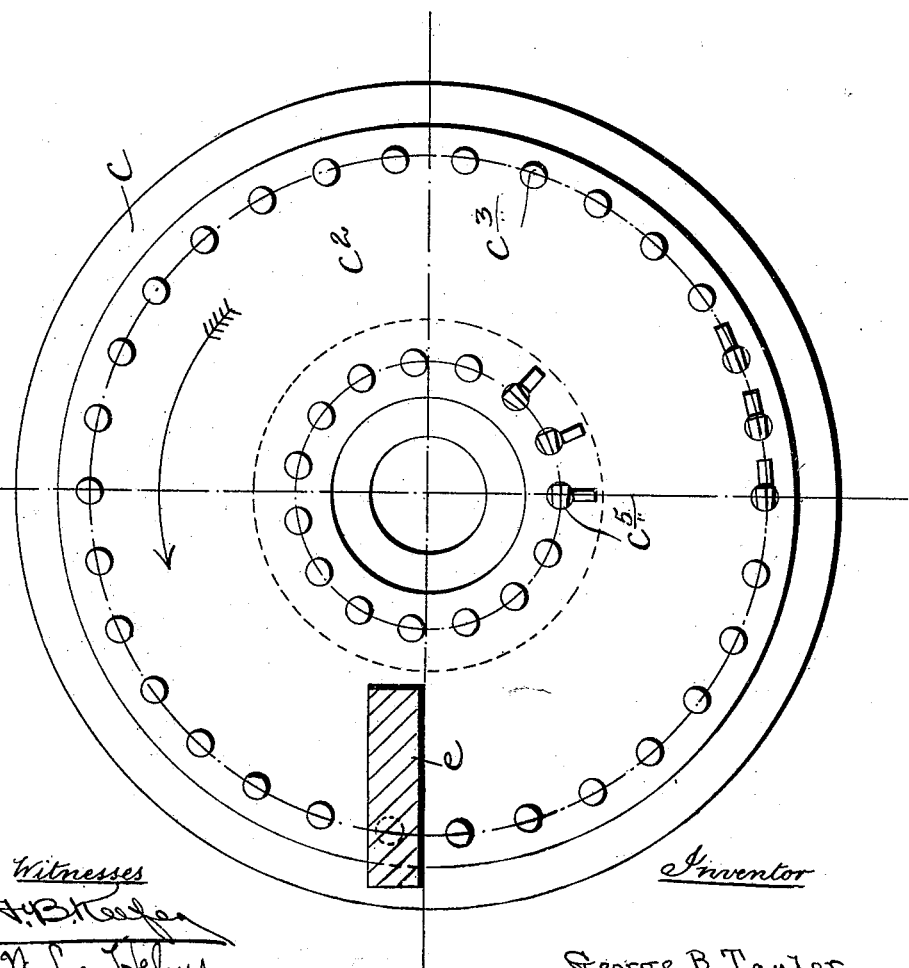

UNITED STATES PATENT OFFICE.

GEORGE BENJAMIN TAYLOR, OF BIRMINGHAM, ENGLAND.

MACHINE FOR CUTTING SPIRAL AND HELICAL TEETH IN CHUCK-JAWS.

SPECIFICATION forming part of Letters Patent No. 643,991, dated February 20, 1900.

Application filed September 27, 1899. Serial No. 731,877. (No model.)

*To all whom it may concern:*

Be it known that I, GEORGE BENJAMIN TAYLOR, a subject of the Queen of Great Britain, residing at Bartholemew street, in the city of Birmingham, England, have invented certain new and useful Improvements in Tools and Machinery for Cutting Spiral and Helical Teeth in the Jaws of Self-Centering Chucks, of which the following is a specification.

This invention consists in the hereinafter-described improvements in tools and machinery for cutting the teeth of movable jaws of self-centering chucks of a particular and well-known construction or type. The construction or type of chuck referred to is one in which the ordinary flat-plane scroll (scroll cut out upon a flat surface) on the face of the rotatable ring with which the jaws engage and by which they are moved is replaced by a spiral or a helix formed upon a conoidal plane fashioned by boring or hollowing out taper the middle of the said rotatable ring, the largest diameter of the hollowing or boring being outermost. The jaws in this type of chuck have their inner ring-engaging faces inclined at a similar angle to the face of the conoidal plane, so as to work upon it, and are fashioned with teeth somewhat of a saw-tooth shape for engaging the said spiral or helix. The ring is rotated by a key to collectively move the jaws.

The improvements are illustrated upon the accompanying sheets of drawings and will be hereinafter particularly described in connection therewith.

Figure 1:
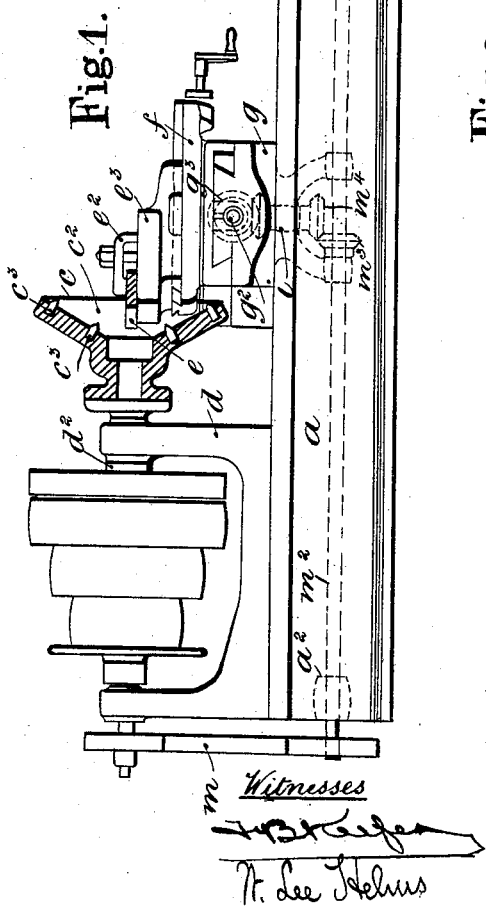
Figure 2:
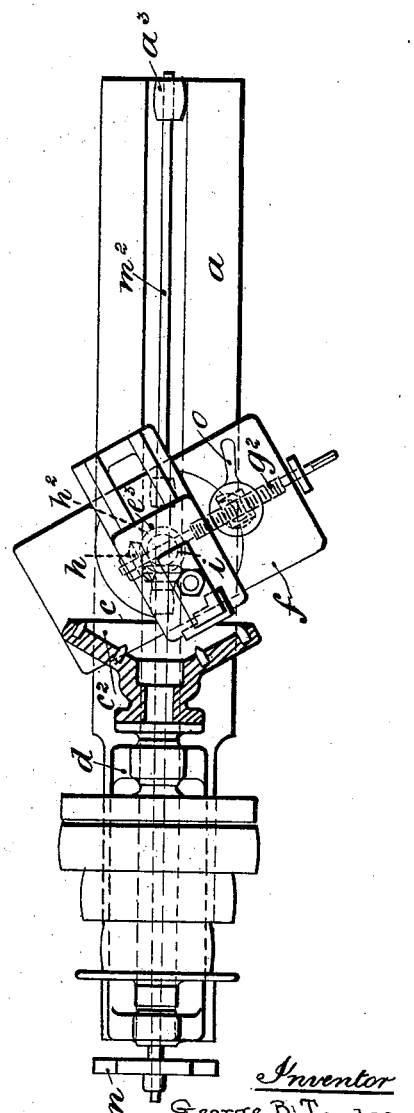
Figure 4:
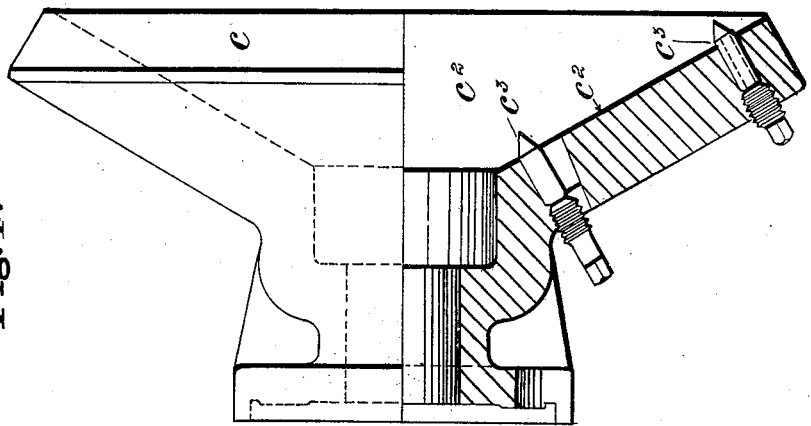
Figure 5:
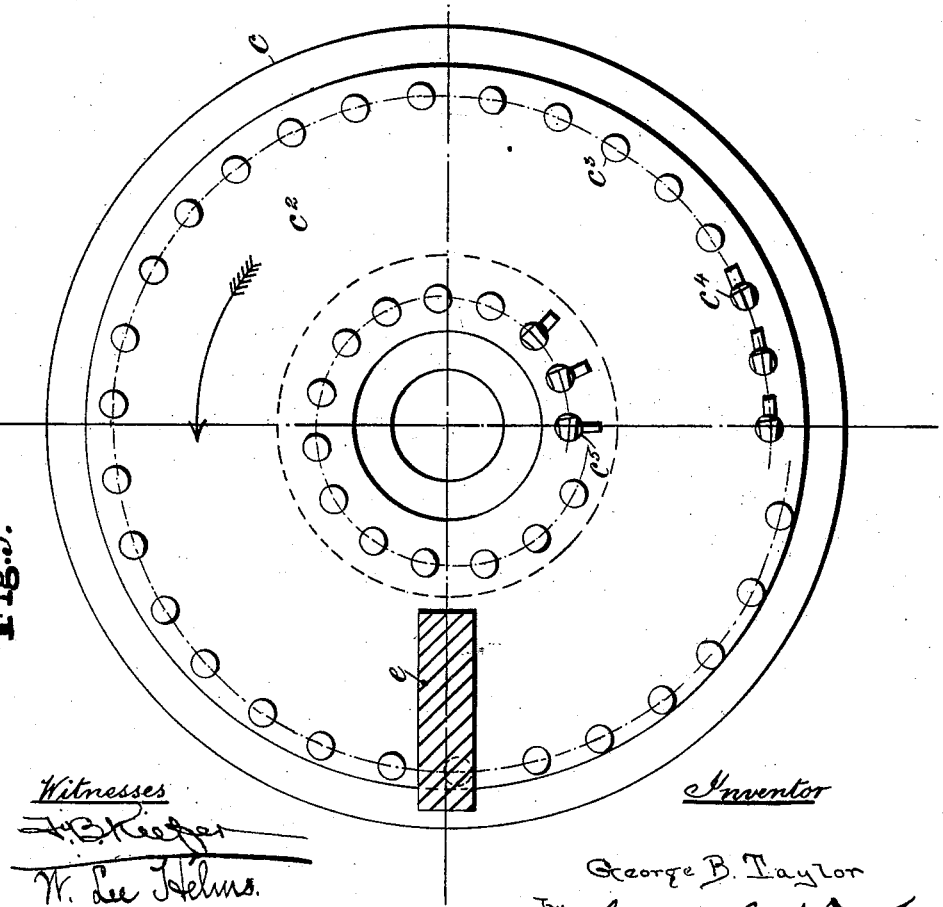

In the drawings, Figures 1 and 2 show the combined tools and machinery in side elevation and top side plan, respectively, while in Figs. 3, 4, and 5 the principal tool—viz., a cutter block or plate—is clearly set forth upon an enlarged scale. A chuck-jaw is shown in Figs. 6 and 7, the first-named figure illustrating the jaw before its teeth are cut and the second-named figure after its teeth have been formed.

In the figures, $c$ is a cutter block or plate adapted to be carried upon a revolving spindle or shaft $d^2$, taking its bearings in a head-stock $d$, mounted upon a bed or base $a$. The face $c^2$ of this cutter-block is hollowed or bored out conical to the exact pitch or inclination of the conoidal face of the rotatable ring before described and is set up with a line or with lines of helically and spirally arrayed cutters $c^3$, which are detachably fitted through the body of the said cutter-block.

In Figs. 3 and 4 two independent lines of cutters are provided, the boundary one, $c^4$, being the roughing-out ring and the inner one, $c^5$, being the finishing-ring. It will be obvious that the two rings $c^4$ $c^5$ may be connected to form one continuous winding of cutters, which in working gradually shape out the teeth. In Fig. 5 the cutters are arrayed in true rings, (not helical,) but their coned disposition is the same as in Figs. 3 and 4.

The jaw $e$ (shown in Fig. 6 before its teeth are cut and in Fig. 7 after its teeth are cut) has its ring-engaging side $e^2$ inclined to the angle of the face $c^2$ of the cutter-block $c$, and it is moved automatically up and down the said face by mechanism, (illustrated in Figs. 1 and 2,) so that the cutters $c^3$ can act upon its said side. The jaw is carried upon a top slide $e^3$, (through a holding-down clamp $e^2$,) working upon a middle slide $f$, which moves back and forth upon a saddle $g$ in a parallel line with the inclination of the face of the hollowing or the bore of the cutter-block, the said saddle $g$ being itself mounted upon the bed or base $a$, so as to be capable of moving up and down thereon. The middle slide $f$ is moved upon the saddle $g$ by a screw $g^2$ and screw-box $g^3$, similar to an ordinary lathe; but in this arrangement of machinery the said screw has fast upon its end a bevel or similar pinion $h$, which gears with another pinion $h^2$ upon a short vertical shaft $i$, supported within the saddle $g$ and rotated from the spindle $d^2$ of the head-stock $d$, to which said spindle is attached the cutter-block.

The intervening gear between the spindle $d^2$ and the short shaft $i$ comprises change-wheels $m$, traversing shaft $m^2$, and bevel-pinions $m^3$ and $m^4$, the last-named upon the shaft $i$ and the pinion $m^3$ upon the shaft $m^2$. The shaft $m^2$ runs the full length of the bed or base $a$ and is supported in end bearings $a^2$ $a^3$, which are attached to the said bed. The pinion $m^3$ rotates only with the shaft $m^2$, but is capable of sliding along with the saddle $g$ independent of said shaft.

The traversing movement of the middle slide $f$ is by the intervening gear relative to the rotating movement of the cutter-block one tooth of the jaw to one complete rotation of the lines of cutters, the positions of the parts when their movement first commences being first set by hand or in other suitable manner.

The slides of the saddle are fitted to work upon each other and upon the bed by V-shaped edges of the one engaging V grooves of the other, a fitting well known in lathe construction.

The screw $g^2$ is by a clutch $o$ capable of being thrown out of gear when the middle slide is required to be hand-operated for setting the work in respect of the position of the cutters.

The cutter-block is preferably so formed as to screw onto the nose end of an ordinary lathe-spindle.

Having now described my invention, what I claim, and desire to secure by Letters Patent, is—

1. The combination of a rotatable cutter-block having a cone-shaped bore, upon the face of which is arranged the helical line or lines of cutters, a jaw-holder having a line of traverse parallel with the conical face of the cutter-block and an automatic traverse equal to the pitch of the helical line of cutters, and mechanism for supporting, rotating and gearing together the cutter-block and jaw-holder, substantially as described.

2. The combination of a rotatable cutter-block having a conical bore, the face of which is fitted with helically-arranged lines of cutters, the said cutter-block being carried on a head-stock spindle, a middle slide supported on a bed to travel back and forth with the conical face of said block, a top slide working on said middle slide and carrying a jaw-holder, and means for automatically moving the said middle slide in relation to the rotation of the spindle carrying the cutter-block, substantially as set forth.

In testimony whereof I have hereunto set my hand in presence of two subscribing witnesses.

GEORGE BENJAMIN TAYLOR.

Witnesses:
GEO. LEERY,
A. F. BIDDLE.